May 12, 1970

A. BAITZ 3,511,249

DEVICE FOR DISLODGING FOOD PARTICLES
FROM BETWEEN HUMAN TEETH
Filed May 13, 1968

INVENTOR
Alexander Baitz
By Sommers & Young
Atty's

United States Patent Office 3,511,249
Patented May 12, 1970

3,511,249
DEVICE FOR DISLODGING FOOD PARTICLES
FROM BETWEEN HUMAN TEETH
Alexander Baitz, South Yarra, Victoria, Australia
(Box 50, G.P.O., Melbourne, Victoria, Australia)
Filed May 13, 1968, Ser. No. 728,628
Claims priority, application Australia, May 24, 1967,
22,262/67
Int. Cl. A61c 15/00
U.S. Cl. 132—89       3 Claims

ABSTRACT OF THE DISCLOSURE

There is disclosed a filament of elastically deformable material for use in cleaning the spaces between human teeth, at least part of the surface of the filament being deformed throughout its length to achieve a mild abrasive action when passed over the surface of the teeth.

---

This invention relates to devices for dislodging food particles from between human teeth.

Various means are in use for this purpose, such as toothpicks, dental floss and the like, however these suffer from the common disadvantage of inefficiency.

It is accordingly the principal objective of this invention to provide a device of the type under consideration capable of economic manufacture and of improved efficiency in use.

With the above stated principal objective in view, there is provided according to the invention for dislodging particles from the between human teeth a ribbon shaped filament of elastically deformable material having at least one longitudinal edge of sinuous configuration.

Conveniently, the filament may be of a finite length suitable for the intended application and both longitudinal edges may be of sinuous configuration.

In use, the filament may be deformed by stretching to facilitate insertion between adjacent teeth and by imparting a reciprocal motion thereto, particles of food debris and the like may be readily dislodged by the surface irregularities of the filament.

A practical arrangement of the invention will now be described with reference to the accompanying drawings in which.

Figure 1:
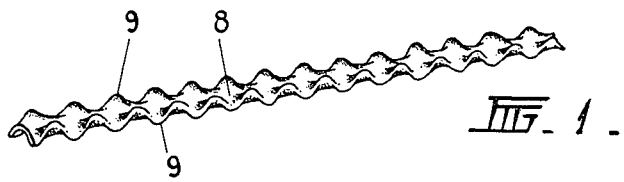
FIG. 1 is a greatly enlarged perspective view of a filament in accordance with the invention.
Figure 2:
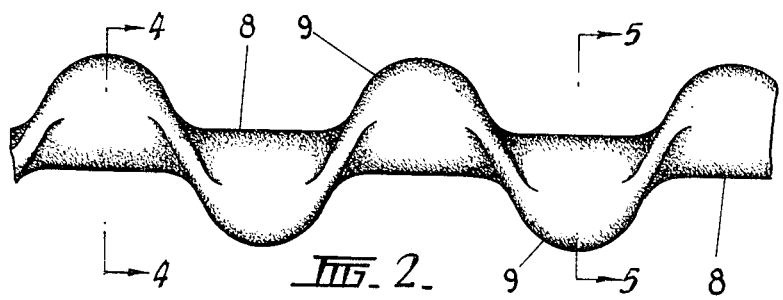
FIG. 2 is an even further enlarged elevation of the filament of FIGURE 1.
Figure 3:
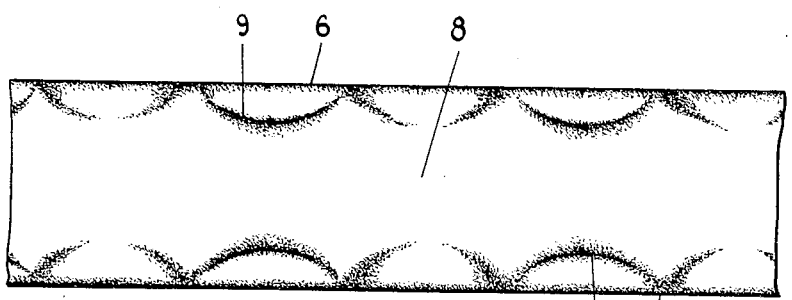
FIG. 3 is a plan view of the filament.
Figure 4:
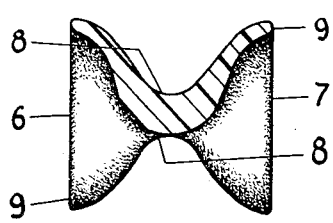
FIG. 4 is a cross sectional view taken on the line 4—4 of FIG. 2.
Figure 5:
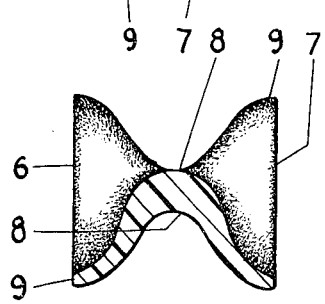
FIG. 5 is a cross-sectional view taken on the line 5—5 of FIG. 2.

Referring now to the drawings, the filament structure shown is of indefinite length and has two parallel longitudinal edges 6 and 7 defining a central portion 8.

The filament is moulded from an elastic rubber material of any suitable composition and produced by any convenient known means. Shown in the drawings in a relaxed state, the sinuous edges 6 and 7 form a series of protuberances 9 on each surface of the structure.

When the filament is drawn through the confined space between two adjacent teeth longitudinal stretching occurs with resultant "bunching" of the protuberances before they pass through the space and this action, combined with the mild abrasive action of the deformed protuberances passing through the space produces an effective cleaning of the teeth surfaces.

Whilst rubber is the preferred material due to its natural resilience, other suitable synthetic materials could be substituted to achieve the desired cleaning action.

I claim:
1. For dislodging particles from between human teeth, an elongated ribbon shaped filament of an elastically deformable material, said filament having substantially constant thickness and being shaped to define two parallel edges of sinuous configuration spaced from one another by an elongated, longitudinally extending, substantially planar central portion, the sinuous configuration of each of said edges consisting of longitudinally spaced, deformable, arcuate protuberances extending alternately above and below the plane of said central portion.

2. The filament of claim 1 wherein said elastically deformable material is a rubber compound.

3. The filament of claim 1 wherein each protuberance extending above the plane of said central portion at one edge of said filament is positioned in facing relation to another protuberance extending above the plane of said central portion at the other edge of said filament, the intervening protuberances extending below the plane of said central portion being similarly positioned in facing relation to one another along the two edges of said filament respectively.

References Cited

UNITED STATES PATENTS

| 1,989,895 | 2/1935 | Gilder | 132—93 |
| 3,153,418 | 10/1964 | Fleming | 132—93 |

ANTONIO F. GUIDA, Primary Examiner

G. E. McNEILL, Assistant Examiner